United States Patent [19]

Nioh et al.

[11] 4,332,211
[45] Jun. 1, 1982

[54] GRANULE PRODUCING APPARATUS

[75] Inventors: Susumu Nioh, Tokyo; Hiroshi Hirayama; Tetsuzo Honda, both of Funabashi; Takashi Nagahama, Mobara; Masaki Naruo, Mobara; Teruo Yoshida, Mobara; Gisaburo Siotu, Kawasaki; Yoshinori Sato, Funabashi; Kenji Toyama, Kamaya, all of Japan

[73] Assignees: Toyo Engineering Corporation; Mitsui Toatsu Chemicals, Inc.; Tsukishima Kikai Co., Ltd., all of Tokyo, Japan; a part interest to each

[21] Appl. No.: 175,214

[22] Filed: Aug. 4, 1980

[30] Foreign Application Priority Data

Aug. 6, 1979 [JP] Japan .................. 54-100131

[51] Int. Cl.$^3$ .................................................. B05C 5/00
[52] U.S. Cl. .................................... 118/62; 118/303; 118/DIG. 5
[58] Field of Search ............ 118/303, 50, 62, DIG. 5, 118/24, 19; 427/213

[56] References Cited

U.S. PATENT DOCUMENTS 3,231,413  1/1966  Berquin .................. 118/303 X
3,386,182  6/1968  Lippert .................. 118/303 X
3,533,829  10/1970  Quanquin .................. 118/303 X Primary Examiner—John P. McIntosh
Attorney, Agent, or Firm—Blanchard, Flynn, Thiel, Boutell & Tanis

[57] ABSTRACT

A granule producing apparatus comprises: a container; an exhaust means provided to the top of the container; a space in the upper interior of the container for separating solid material from gases; a space for a fluid bed in the lower interior of the container; a porous floor immediately below the fluid bed space for defining the lower limit of the fluid bed; an air chamber beneath the porous floor for supplying air streams to form the fluid bed; a means for supplying jet stream of air, provided below the fluid bed air stream supply chamber; a plurality of parallelly arranged funnels, said each funnel consisting of an inverse truncated cone and a cylindrical pipe connected to the lower end of the cone, said upwardly enlarged cone opens into the interior of the container with its upper end merging with the porous floor, said each cylindrical pipe having its lower end connected to the jet stream supply means; a means disposed within the upper portion of the cylindrical pipe of each funnel for spraying liquid under pressure into the jet air stream so that the sprayed liquid adheres to the granules and solidifies as it dries; a means fitted to the side wall of the container for supplying granules into the fluid bed space; and a means fitted to the side wall of the container for discharging the granules treated out of the fluid bed space.

6 Claims, 5 Drawing Figures

GRANULE PRODUCING APPARATUS

This invention relates to a granule processing apparatus for enlarging granules by coating them with a sprayed liquid of the same or a different substance from that of the granules. Specifically, this invention relates to an apparatus in which the liquid of the substance that is the same or different from that of the granules is sprayed under pressure into the air stream so that the sprayed liquid adheres to the granules and solidifies as the granules are dried, for the purpose of coating the granules with the sprayed substance or enlarging the granules.

In various fields of industry there are growing needs to enlarge granules or coat them with a substance that is the same or different than that of the granules.

When a small amount of granules is to be treated, no technical or economic problem will arise and the enlarging and coating of granules can easily be accomplished.

Figure 1:
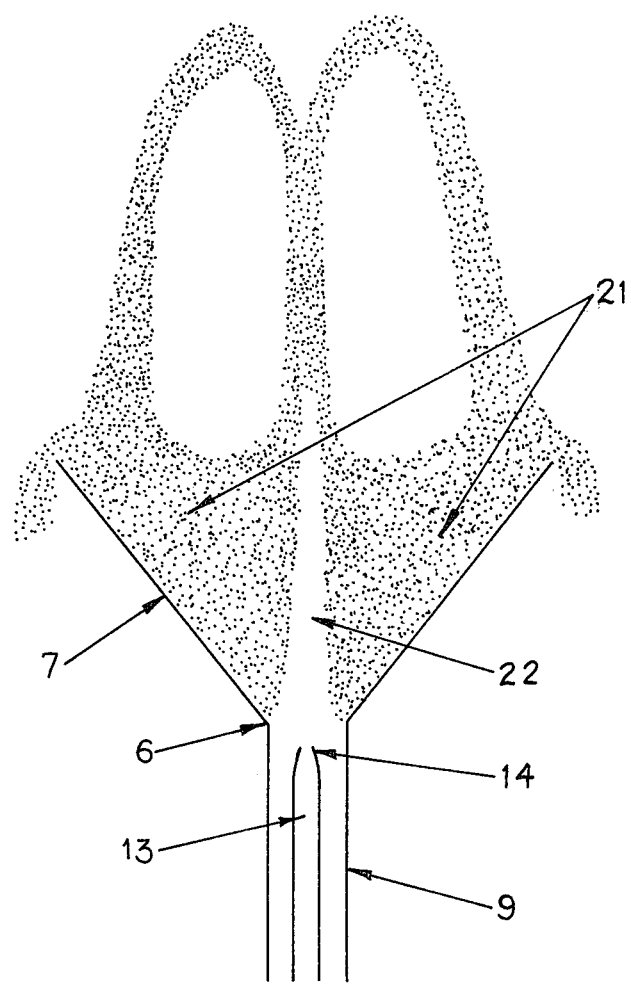
FIG. 1 is a vertical cross-sectional view of a funnel showing a jet stream flowing upward through the inverted truncated cone of the funnel.

In the drawings, the reference numerals identify the following parts: 1 is a container body, 2 is an exhaust pipe, 3 is an arrestor, 4 is a granule supply pipe, 5 is a treated granule discharge pipe, 6 are funnels, 7 are inverted truncated cones, 8 is a porous floor, 9 is a pipe, 10 is an air stream supply chamber, 11 is a lower floor, 12 is an air stream supply chamber, 13 is a pipe, 14 is a spray nozzle, 15 is a pipe, 16 is a pipe, 21 is a layer of granules, 22 is a jet stream.

The object of this invention is to provide a device which is easy to operate and stable in operation and by which a large amount of granules can be treated with high efficiency. Referring to FIG. 1 showing the main portion of the device according to this invention, the upwardly directed jet stream 22 of sprayed liquid of a certain substance flows through the center of the funnel 6 containing the granules, so that the sprayed substance is applied to the surfaces of the granules during the short period of time that these granules are carried up by the stream of sprayed liquid. The granules are disturbed by the stream and are repeatedly contacted with the stream of sprayed liquid until the granules are coated to a desired thickness. The sprayed liquid adhering to the surfaces of the granules rapidly solidifies as it cools or dries in the short period of time during which the granules are carried up the stream. Each granules is required to be fed more than once to the jet stream 22 wherein the small droplets of the substance to be applied impinge against the granules. The larger the diameter of the granules and the larger the amount of the liquid to be applied to the granules, the greater must be the number of times that each granule is fed to the jet stream.

The jet stream 22 penetrates upwardly into the central portion of the layer 21 of the granules 21. It is desired that the granules at the lower end of the funnel or near the base of the jet stream 22 be smoothly fed into the jet stream 22 so that as the granules around the base of the jet stream are carried up with the stream and fall onto the upper surface of the layer 21, the granules in the lower portion of the layer 21 move successively and smoothly downwardly toward the jet stream 22. This ensures smooth circulation of the granules. This process must be repeated a number of times, as already mentioned. It is also necessary that all the granules be processed as nearly the same number of times as possible.

For the granules to be successively fed into the jet stream 22 in an orderly manner, the container 7 containing the granules to be treated has the shape of an inverted truncated cone, along the central vertical axis of which the jet stream 22 flows upwardly through the funnel. The pressure of the jet stream 22 must be increased as the depth of the granule layer 21 increases, and when the depth of the layer reaches a certain limit, the continuous flow of jet stream is blocked by the thick layer of granules.

Due to this deterioration of the jet stream stability, there is a limit on the size of the funnel, although the limit varies according to the characteristics of the granules to be treated. Thus, in order to increase the amount of granules that can be treated, there is no alternative other than to increase the number of funnels.

However, if the number of funnels is increased to enlarge the capacity of the device, the number of heat exchangers, classifiers and other items of equipment equipment as well as the amount of piping needed will also increase, pushing up the equipment cost and operating cost.

Figure 2:
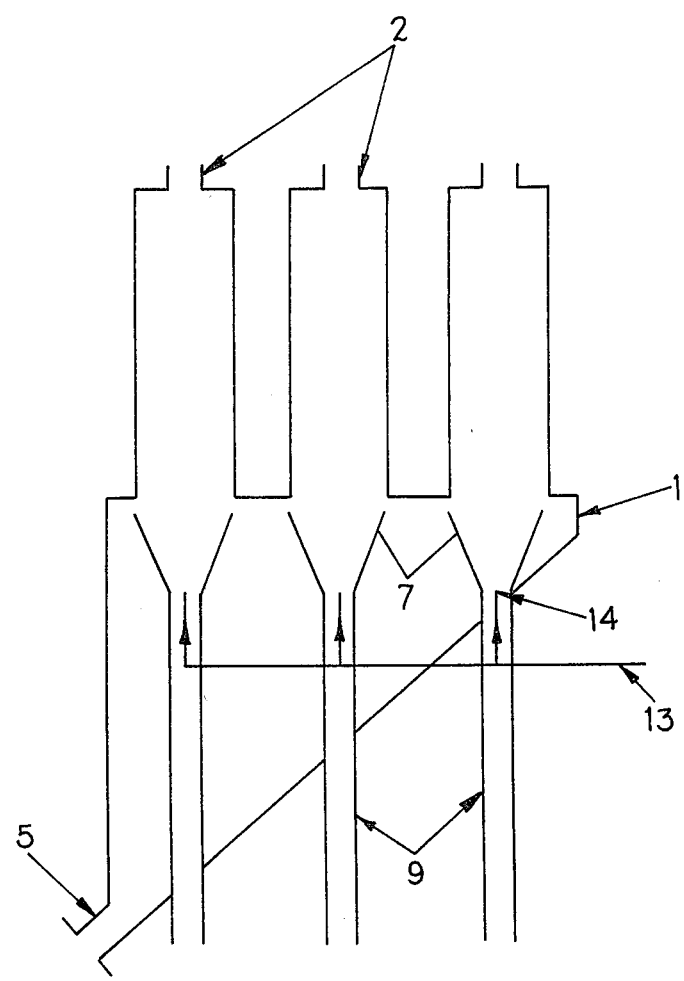
FIG. 2 is a vertical cross-sectional view showing a plurality of funnels contained in one chamber.

FIG. 2 shows another type of granulator in which a number of funnels 6 are provided in a single container body 1. This type of device has the disadvantage that the system for adjusting the amount of granules supplied, the jet stream and the sprayed liquid is complex.

Fine adjustments are required to maintain the stable processing of granules even in a single funnel. Thus, it is more difficult to control the granule processing in a plurality of funnels at one time by controlling three granule supply systems, a jet stream supply system and a sprayed liquid supply system.

If, instead, each funnel is provided with control equipment for each supply system, stable processing of granules may not be obtained because the amount of granules contained in each funnel cannot be measured precisely due to rapid movement of granules.

Figure 3:
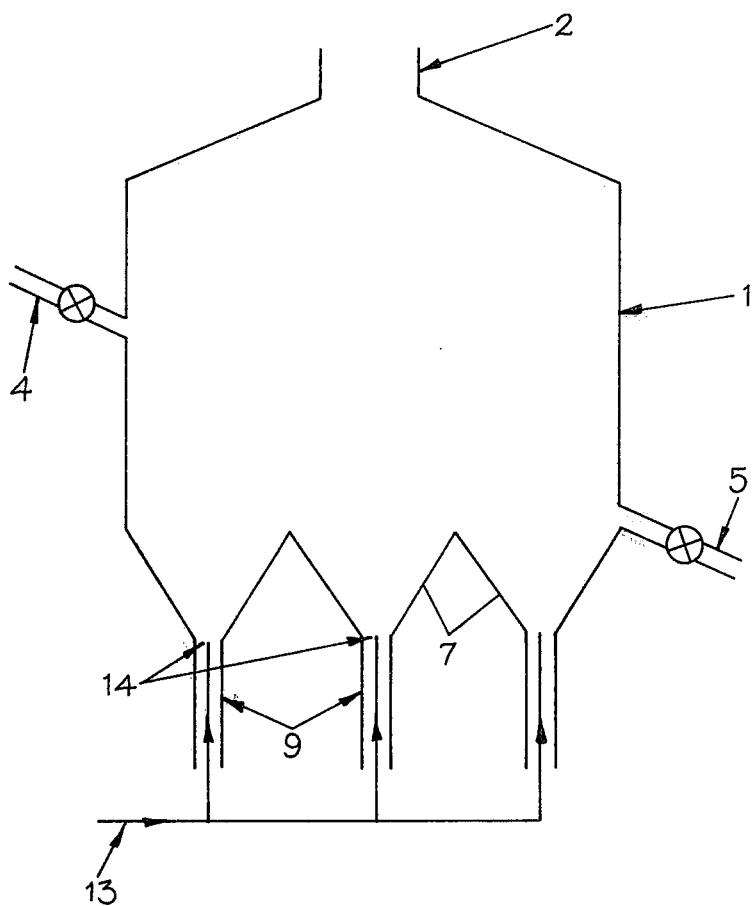
FIG. 3 is a vertical cross-sectional view showing a plurality of funnels located close together in one chamber.

To avoid the difficulty involved in controlling the supply systems encountered in the conventional device in which a number of funnels are contained in one chamber, and to improve the free movement of grains from one funnel to other funnels, the present inventors have located the funnels close together, as shown in FIG. 3. Experiments have been conducted with this device and it was found that there are differences in the amount of grains among the funnels and that the jet streams are very unstable in those funnels near the grain supply end of the chamber. The provision of another supply system to distribute the granules uniformly among the funnels would make the adjusting system complicated. Investigating the results of the experiments, the inventors found it is most effective, in distributing the granules among the funnels, to space the funnels certain distances from one another and to form a fluid bed of the granules between the funnels so that the fluid bed works as a passage for the granules to move freely. Experiments have confirmed that this device equipped with a fluid bed works effectively.

The fluid bed, which provides a good distribution passage for the granules, not only makes it possible to arrange a number of funnels in parallel on a plane but also aids in drying, cooling and heating the granules over a wide range of conditions.

Unlike ordinary distribution passages, the fluid bed of the present invention allows the granules free movement in all directions, which explains why the fluid bed works as a good distribution device for the granules.

The granule producing apparatus according at this invention comprises: a container; an exhaust means provided to the top of the container; an air stream supply means for the fluid bed and another air stream supply means for producing a jet stream, both being provided in the lower portion of the container; a means for supplying sprayed adhesive substance, provided at the lower portion of the container; a means for supplying granules into the container, provided at the upper middle portion of the container; a means for discharging treated granules, provided at the middle portion of the container; a plurality of vertically extending funnels arranged on virtually the same horizontal plane; and a horizontal porous floor virtually flush with the upper edge of the funnels and continuously connecting the funnels. The adhesive substance is sprayed under pressure into the jet stream of air flowing upwardly along the center axis of each funnel thereby applying the sprayed substance to the granules contained in the funnels, and the granules outside the funnels are kept floating above the porous floor by the action of the air stream flowing up through the porous floor so that the granules are always agitated or disturbed to form a fluid bed of granules.

The device of the invention will now be explained with reference to the accompanying drawings by describing an example wherein the device is used to form large granules of urea.

Figures 4, 5:
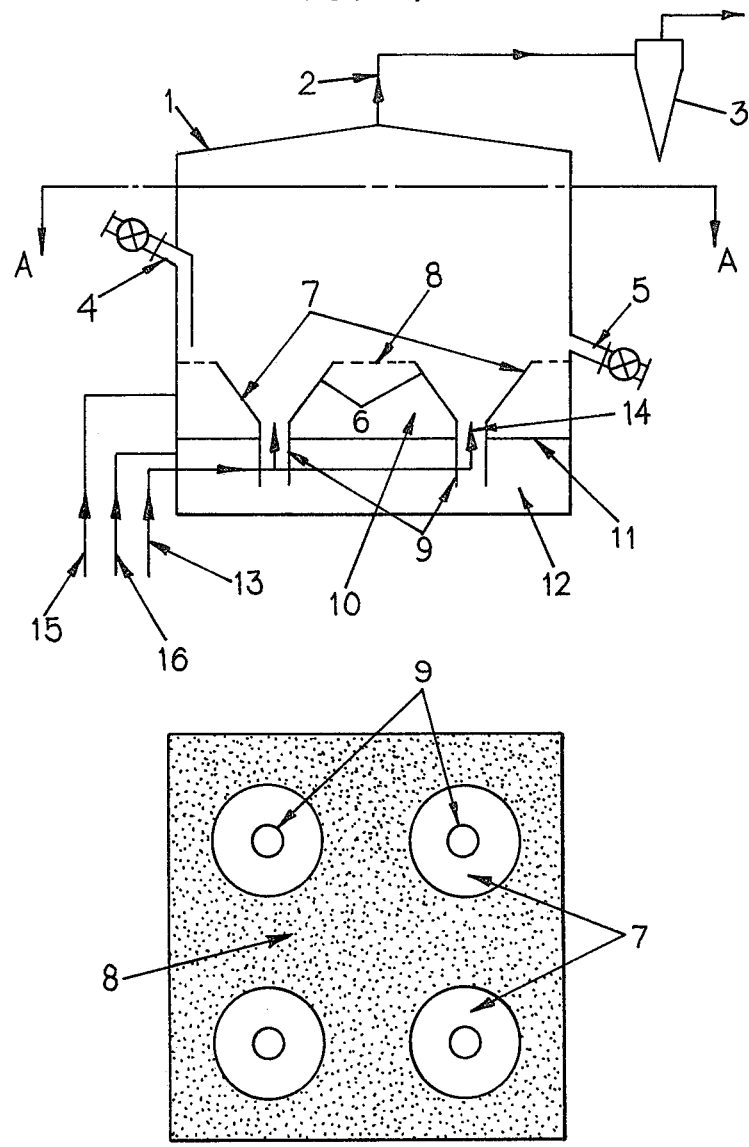
FIG. 4 is a cross-sectional view of the device of this invention showing the operating principle of this invention.
FIG. 5 is a cross-sectional view taken along the line A—A appearing in FIG. 4.

FIG. 4 is a vertical cross section of the apparatus of this invention, showing the operating principle. The container 1 is equipped at the top with an exhaust pipe 2 to which an arrestor 3 is attached. The container 1 also has a granule supply pipe 4 and a treated granule discharge pipe 5, fitted to the upper middle portion and the lower middle portion of opposing side walls, respectively.

The number of exhaust pipes 2, supply pipes 4 and discharge pipes 5 may be increased as required according to the capacity of the device. The supply pipe 4 may either be mounted, as shown, on the upper middle portion of a side wall of the container or may be made to pass downwardly through the top of the container to the central portion inside it. A plurality of funnels 6 are installed in the lower portion of the container 1 and the bottom portions of the inverted truncated cones 7 of the funnels 6 are connected to the tubes 9 for directing the air stream upwardly. When the jet stream is generated by vacuum, the tubes 9 may be omitted or shortened.

An air stream supply chamber 10 is located beneath the porous floor 8, and under the lower floor 11 is provided a jet stream supply chamber 12 into which open the lower ends of the tubes 9 of the funnels.

The pipe 13 for supplying the melted urea is passed through the lower portion of a side wall into the container 1 where it is branched and connected to each spray nozzle 14 located in the upper central portions of the tubes 9.

Air is supplied to the air stream supply chamber 10 and the jet stream supply chamber 12 through the pipes 15 and 16, respectively, which are connected to a blower not shown.

In FIG. 4 the upper edges of the funnels 6 and the porous floor 8 are shown flush with each other, but the funnels 6 may be so arranged that there are slight differences in height between their upper edges in order to optimize the movement and distribution of the granules according to the use of the apparatus. It is also possible to give the porous floor a slight inclination 8 or provide steps in it. Although in FIG. 4 the discharge pipe 5 is fitted to a side wall of the container 1, it may be made to extend vertically upwardly through both the jet stream supply chamber 12 and the air stream supply chamber 10 and into the interior of the container 1 where it opens an appropriate distance above the porous floor 8.

The function of the invention will now be explained with reference to the production of granules of urea.

Air at a temperature of 20° C. is supplied at the rate of 16700 Nm$^3$/H to the jet stream supply chamber 12 wherein the pressure is maintained at 1000 mm water column. Air at the same temperature is also supplied at the rate of 24700 Nm$^3$/H to the air stream supply chamber 10 in which the pressure is maintained at 500 mm water column.

The pipe 13 supplies melted urea at 138° C. at a rate of 8.4 tons per hour to the nozzles 14 from which it is sprayed into the air streams flowing upwardly through the pipes 9.

Granules of urea less than 3 mm in diameter are supplied into the container at the rate of 8.4 t/H.

The liquid urea is sprayed from the nozzle 14 by the action of the jet stream of air, producing a stream of atomized urea flowing upwardly through the inverted truncated cone 7. Granules in the funnel 6 then circulate with the stream. The granules are successively brought to the bottom of the funnel and enter into the jet stream, where they combine with small droplets of urea sprayed from the nozzle. As a result of this process the granules of urea become larger and larger. The granules of urea supplied from the supply pipe 4 form a fluid bed of granules floating about 100 mm above the porous floor 8 and the granules of the fluid bed are evenly distributed among the inverted truncated cones 7. The granules become large as they are repeatedly circulated through the streams of the sprayed urea. These enlarged granules are agitated by the air from the porous floor and caused to move in the fluid bed while colliding with one another.

The average diameter of the granules thus treated in the container 1 is greater than that of the granules being introduced from the supply pipe 4.

The granules of urea are discharged continuously from the discharge pipe 5 at the same rate that urea is being supplied from the supply pipe 4 and the liquid urea supply pipe 13.

The treated granules thus discharged are classified according to their diameters to obtain granules within the desired diameter range.

The granules of urea that are not in the desired diameter range or are caught by the arrestor are recirculated to the device through the supply pipe 4 for further treatment.

In this example, the temperature of the treated granules when discharged from the discharge pipe 5 is about 62° C., so further cooling is not needed. The exhaust pipe 2 releases exhaust gases at 79° C.

Since FIG. 4 is a vertical cross section, only one row of funnels is shown. The diameters of the product granules depend mainly on the diameter and the amount of granules supplied from the pipe 4.

The advantages of the device of this invention may be summarized as follows.

First, granule production capacity can be increased with minimum additional facility cost.

Second, since distribution and collection of the granules are carried out smoothly, the granules in the funnels can be treated uniformly, thereby improving productivity.

Third, the fluid bed can perform the functions of cooling, heating, drying or humidifying and other preliminary and follow-up treatments so that no additional equipment is required for these functions.

Fourth, by reducing the depth of the inverted truncated cones, it is possible to shorten the time during which the granules stay in the funnels and to lengthen the time during which they remain in motion in the fluid bed in which they are thoroughly mixed by the stream of air. Hence, it is possible to treat the granules uniformly by adjusting the periods in which the granules are present in the funnels and the fluid bed. Furthermore, the pressure of the jet stream of air is adjustable.

Fifth, the overall height of the device is small. This enables the associated equipment to be installed at relatively low locations, which in turn reduces construction as well as operation costs.

We claim:

1. An apparatus for enlarging the sizes of granules, comprising:

an upright container having a sidewall, a top wall and a bottom wall, said container having a horizontal, perforate, first wall extending thereacross and dividing the interior of said container into an upper portion and a lower portion, said upper portion being adapted to contain a bed of the granules, said container having a horizontal, imperforate, second wall extending across said lower portion of said container, said imperforate second wall being spaced downwardly from said perforate first wall and spaced upwardly from said bottom wall, the space between said first wall and said second wall defining a first, air stream supply chamber, the space between said second wall and said bottom wall defining a second, air stream supply chamber; a plurality of parallel, upright, spaced apart, imperforate funnels extending downwardly from said first wall to said second wall, each funnel comprising an upper section in the form of a vacant, inverted truncated cone whose wide upper end opens into said upper portion of said container and whose narrow lower end is located close to said second wall, and a cylindrical pipe coaxial with and extending downwardly from the lower end of said cone and penetrating through said second wall and opening into said second air stream supply chamber, said inverted truncated cone being adapted to be substantially filled with granules; nozzle means disposed in each of said cylindrical pipes for spraying droplets of liquid into said cylindrical pipes; first air supply means connected to said first air stream supply chamber for supplying pressurized air thereto which air flows upwardly through the perforations in said first wall to form a fluidized bed of granules above said first wall; second air supply means connected to said second air stream supply chamber for supplying pressurized air thereto which latter air flows upwardly in the form of jet streams through said pipes to entrain said droplets therein and thence through said funnels so that the granules in said funnels are coated by the liquid and are circulated in toroidal flow above said funnels; feed means for supplying feed granules into said upper portion of said container; discharge means attached to the sidewall of said container above and close to said first wall for discharging granules of enlarged size; and means for exhausting gas from the upper end of the upper portion of said container.

2. An apparatus as claimed in claim 1, wherein said funnels are arranged in parallel rows.

3. An apparatus as claimed in claim 1, further comprising an arrestor connected to said exhausting means and adapted to filter out and recapture for recycling granules carried out of said container through said exhausting means.

4. An apparatus as claimed in claim 1, wherein the upper edges of said funnels are flush with said perforate wall.

5. A granulator as claimed in claim 1, wherein said granule feed means and said granule discharge means are positioned on opposite sides of said container.

6. An apparatus for enlarging the sizes of granules, comprising:

an upright container having a sidewall, a top wall and a bottom wall, said container having a horizontal, perforate, wall extending thereacross and dividing the interior of said container into an upper portion and a lower portion, said upper portion being adapted to contain a bed of the granules; means defining a gas stream supply chamber below said perforate wall; a plurality of parallel, upright, spaced apart, imperforate funnels extending downwardly from said perforate wall, each funnel comprising an upper section in the form of a vacant, inverted truncated cone whose wide upper end opens into said upper portion of said container, and a cylindrical pipe coaxial with and extending downwardly from the lower end of said cone, said inverted truncated cone being adapted to be substantially filled with granules; nozzle means disposed in each of said cylindrical pipes for spraying droplets of liquid into said cylindrical pipes; first gas supply means connected to said gas stream supply chamber for supplying pressurized gas thereto which gas flows upwardly through the perforations in said perforate wall to form a fluidized bed of granules above said perforate wall; second gas supply means connected to the lower ends of said pipes for supplying pressurized gas thereto which latter gas flows upwardly in the form of jet streams through said pipes to entrain said droplets therein and thence through said funnels so that the granules in said funnels are coated by the liquid and are circulated in toroidal flow above said funnels; feed means for supplying feed granules into said upper portion of said container; discharge means attached to the sidewall of said container above and close to said first wall for discharging granules of enlarged size; and means for exhausting gas from the upper end of the upper portion of said container.

* * * * *